(12) United States Patent
Rais et al.

(10) Patent No.: US 8,837,106 B2
(45) Date of Patent: Sep. 16, 2014

(54) METHOD FOR CONTROLLING AN IONIZATION DEVICE

(75) Inventors: Thomas Rais, Marbach-Neckar (DE); Eric Pitz, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 87 days.

(21) Appl. No.: 13/401,425

(22) Filed: Feb. 21, 2012

(65) Prior Publication Data

US 2012/0212876 A1 Aug. 23, 2012

Related U.S. Application Data

(63) Continuation of application No. PCT/EP2010/061472, filed on Aug. 6, 2010.

(30) Foreign Application Priority Data

Aug. 21, 2009 (DE) .......................... 10 2009 038 296

(51) Int. Cl.
*H01T 23/00* (2006.01)
(52) U.S. Cl.
USPC .......................................... 361/231; 361/230
(58) Field of Classification Search
USPC .................................................. 361/230, 231
See application file for complete search history.

(56) References Cited

U.S. PATENT DOCUMENTS

| | | | |
|---|---|---|---|
| 6,375,714 B1 | 4/2002 | Rump et al. | |
| 6,602,330 B2 * | 8/2003 | Allen | 96/58 |
| 6,985,346 B2 | 1/2006 | Kraz et al. | |
| 7,846,227 B2 * | 12/2010 | Gotoh et al. | 55/385.3 |
| 8,305,728 B2 * | 11/2012 | Lee et al. | 361/231 |
| 2006/0237662 A1 | 10/2006 | Schlitz | |
| 2007/0202799 A1 * | 8/2007 | Giraud et al. | 454/290 |
| 2009/0001787 A1 * | 1/2009 | Lawall et al. | 297/217.1 |
| 2012/0264361 A1 * | 10/2012 | Scheer et al. | 454/75 |

FOREIGN PATENT DOCUMENTS

| | | |
|---|---|---|
| DE | 1 261 295 B | 2/1968 |
| DE | 199 19 623 A1 | 11/2000 |
| EP | 1323589 B1 * | 10/2002 |
| EP | 1 323 589 A1 | 7/2003 |
| EP | 1 401 247 A2 | 3/2004 |
| GB | 2 406 222 A | 3/2005 |
| JP | 2002/277010 A | 9/2002 |
| JP | 2004-79471 A | 3/2004 |
| JP | 2004-182123 A | 7/2004 |
| JP | 2006-349289 | 12/2006 |
| WO | WO 2006/134681 A1 | 12/2006 |
| WO | WO 2009/045430 A1 | 4/2009 |

* cited by examiner

*Primary Examiner* — Rexford Barnie
*Assistant Examiner* — Angela Brooks
(74) *Attorney, Agent, or Firm* — Muncy, Geissler, Olds & Lowe, P.C.

(57) ABSTRACT

A method for controlling an ionization device for ionizing air for the ventilation of motor vehicle interiors. The ionization device releases ions of a first ion type at least intermittently. In addition, the ionization device is operated at least intermittently in at least one regeneration mode.

18 Claims, 2 Drawing Sheets

METHOD FOR CONTROLLING AN IONIZATION DEVICE

This nonprovisional application is a continuation of International Application No. PCT/EP2010/061472, which was filed on Aug. 6, 2010, and which claims priority to German Patent Application No. DE 10 2009 038 296.8, which was filed in Germany on Aug. 21, 2009, and which are both herein incorporated by reference.

BACKGROUND OF THE INVENTION

1. Field of the Invention

The invention relates to a method for controlling an ionization device, particularly a method for controlling an ionization device for ionizing air for ventilating interior spaces, preferably the interior spaces of vehicles, the method in which the ionization device releases at least intermittently ions of a first ion type. Furthermore, the invention relates to an ionization device, particularly an ionization device for ionizing air for ventilating interior spaces, preferably the interior spaces of vehicles, the device which has at least one first ionizing component for the at least intermittent release of ions of a first ion type.

2. Description of the Background Art

To satisfy the comfort requirements of vehicle customers which have increased over the years in relation to the ventilation of motor vehicles, the functionality and complexity of vehicle HVAC systems has increased correspondingly.

Thus, in the meantime, HVAC systems have gained acceptance in all vehicle categories. The fresh air to be supplied to the vehicle interior can be heated with such vehicle HVAC systems. Today, however, a cooling function is also generally provided, with which the fresh air to be supplied to the vehicle interior can also be cooled.

Other functions, which are meanwhile realized increasingly for the ventilation of motor vehicles, are, for example, filters, which are used to purify the fresh air to be supplied to the vehicle interior and/or to remove undesirable odors (particularly odors in outside air).

Ionization devices have also been installed for some time in motor vehicle as part of the original equipment. The ionization devices, on the one hand, are intended to take care of refreshing the air, therefore to create the perception that there is "fresh air." On the other hand, ionization devices are used to kill pathogenic agents (particularly bacteria and/or viruses), which may be present in the fresh air and/or recirculated air to be supplied to the vehicle interior. A combination of a positively charged electrode and a negatively charged electrode is generally used to kill pathogenic agents. $HO_2^-$ is often used as the active ion in this case. To generate $HO_2^-$, $H^+$ is generated with the aid of a positively charged electrode from water ($H_2O$), which is present in the form of air moisture, and is then reduced to H at the negatively charged electrode. H then combines with $O_2^-$ to form active $HO_2^-$.

To refresh air, in contrast, negatively charged (simple) high-voltage electrodes are generally used, which, for example, reduce oxygen molecules ($O_2$) in the supplied air to negatively charged oxygen ions ($O_2^-$).

So that the ionization devices can exert their effect, it is not only necessary that they generate these ions, but that the ions generated by the ionization devices also remain present for a rather long time period and advantageously are released in the interior space to be ventilated. This is a problem particularly in the motor vehicle field, where the conditioned air is guided over a rather large number of air guide elements, air vent grilles, and outlet nozzles, before the conditioned air is released into the vehicle interior. Tests have shown that an initially sufficiently high ion concentration can decline by more than a factor of 10 within a few minutes. This reduces the effectiveness of the air ionization and necessitates appropriate countermeasures.

It is proposed in JP 20063492989 A, for example, to provide a flexible air guide tube of an HVAC unit, which has an ionization device, with a continuous electrically conductive coating. The electrically conductive coating is grounded. In the proposed design, the intent is to prevent the ions flowing through the tube from being electrically neutralized and thereby lost.

A method is described in JP 2004-079471 A with which the loss of already generated anions in an air duct downstream from the ionization device is to be prevented. It is proposed to this end that the ionization device after continuous operation for a time period of 10 to 40 minutes be turned off for about 3 to 7 minutes.

Various organic polymer compositions, which are provided with a metallic coating, for use as air ducts in motor vehicles are proposed in WO 2009/045430 A1.

Although the already proposed measures are basically suitable for reducing the described problem of the loss of already generated ions, the previously proposed methods and devices continue to have highly different problems such as, for example, high cost, insufficient effectiveness, and excessive electrical neutralization of already generated ions.

SUMMARY OF THE INVENTION

It is therefore an object of the invention to provide a method for controlling an ionization device, particularly an ionization device for ionizing air for ventilating interior spaces, preferably the interior spaces of vehicles. A further object of the invention is to propose an ionization device, particularly an ionization device for ionizing air for ventilating interior spaces, preferably the interior spaces of vehicles.

It is therefore proposed to refine a method for controlling an ionization device, particularly an ionization device for ionizing air for ventilating interior spaces, preferably the interior spaces of vehicles, said method in which the ionization device releases at least intermittently ions of a first ion type, in such a way that the ionization device is operated at least intermittently in at least one regeneration mode. For example, the ionization device may have a suitably formed electrode, at which a negative high voltage is applied. The electrode then releases negatively charged ions, therefore so-called anions. Air containing negative ions is usually perceived as "fresh air." Accordingly, the term of a so-called "relax" operating mode is used. Likewise, it is also possible that in the case of the ionization device a suitably formed electrode is provided at which a positive high voltage is applied. Such a positively charged high-voltage electrode accordingly emits positively charged ions, so-called cations. The generated cations (for example, $H^+$ ions) can be combined with other molecules and/or ions (for example, with $O_2^-$ ions to form $HO_2^-$ ions), which in turn can have a purifying (e.g., bactericidal) effect. For this reason, a "clean" operating mode is generally discussed in this regard. Of course, it is possible that a plurality of electrodes (both with the same high-voltage supply and with a different high-voltage supply) are also provided. Regardless of the specific ion type, particularly in the case of the exclusive or predominant release of anions or cations (which optionally can also be present intermittently only as an "intermediate step") and/or of specific ion types (such as, for example, $O_2^-$ ions and/or $HO_2^-$ ions), an electrostatic charging of components usually occurs, which are connected downstream of the ionization device, when viewed in the airflow direction. In this regard, this can refer, for example, to air guide elements, air vent grilles, air vent nozzles, and the like. Because of the ions present in the airstream, the corresponding component surfaces are electrostatically charged. As a result, electric fields arise which in turn have an effect on airflow, especially on the ions present in the airflow. As a result, a highly complex dynamic structure arises which can also be barely described numerically. The different dynamic charge distributions, however, usually cause an "obstruction" of the ions carried along in the airstream (generally in that the ions are deflected and then destroyed by contact with a wall). Experiments have shown in this regard that even after a few minutes a drastic reduction in the ion concentration finally released into a vehicle interior can result. The time interval after which a significant loss of released air ions (up to a factor 10 and more) can occur is therefore surprisingly much shorter than previously assumed. Tests have shown that the reduction of the released ions by a factor of 10 is achieved even after 1 to 5 minutes. It is therefore necessary, also in typical operating cycles in a motor vehicle (for example, in an automobile), to provide suitable countermeasures which counteract the described reduction in the number of ions released into the vehicle interior. It is proposed in the present invention that suitable regeneration phases are provided for this purpose. During the regeneration phases, it can be deliberately accepted here that the (actual) desired concentration mixture and/or the concentration of the ions released into the vehicle interior change over a specific—shortest possible—time period. It is even conceivable that the number of released ions (at least in the case of certain ion types) can be taken back to 0 for a short time. Nevertheless, despite the inclusion of such regeneration phases, it is possible to increase the amount of air ions released over a time average due to the regeneration phases or to allow the concentration ratio of the ions released in the vehicle interior space to approach the desired target value especially closely. This is particularly possible in that, for example, a relatively high concentration of ions can be released into the vehicle interior during the "active" phases, which occur between the regeneration phases. As a rule, the regeneration phase has less of an effect on the actual ionizing component than on components downstream of the ionizing component in the airstream (for example, ventilation ducts and/or air outlet nozzles).

It is of advantage if the method is carried out in such a way that in at least one regeneration mode ions with a second ion type, different from the first ion type, are released at least intermittently. An ion type can be understood to be a different sign of the charge. If, therefore, for example, the ions of the first ion type are anions, the ions of the second ion type accordingly can be cations (which optionally can be present temporarily also only in the form of an "intermediate stage"). In addition or alternatively, however, the ions may also have a different charge (for example, single, double, triple, etc., elementary charge). In addition or alternatively, this can refer especially to different molecules, which are or were ionized (such as, for example, the already previously described $O_2^-$ and $HO_2^-$ ions). Especially when ions with an opposite charge are released during the regeneration mode, the optionally already electrostatically charged areas of the components downstream of the actual ionizing component can be discharged by the placement of opposite charge carriers. It is also possible to generate as it were an opposite preliminary charge distribution, so that in a first operating phase, downstream of the regeneration phase, of the ionization device the components downstream of the actual ionizing component are discharged first, and only then recharged by the ions of the first ion type. Especially if a regeneration occurs with ions of the second ion type, the duration of the regeneration phase can be typically within a range between 5 and 30 seconds, whereas the "normal" operating time is in an interval between 30 seconds and 3 minutes.

It is possible that in the methods ions of the second ion type are released at least intermittently in addition and/or at least intermittently alternatively to the ions of the first ion type. It is therefore possible that predominantly or (substantially) exclusively ions of the second ion type are released (at least intermittently) during the regeneration phase. In this case, the duration of the regeneration phase typically can be kept as especially short. Likewise, it is also possible, however, that ions of the second ion type are released, whereas the generation of ions of the first ion type is carried on substantially continuously. As a result, a greater constancy of release of "fresh air" into the vehicle interior can be achieved. Moreover, the control of the corresponding electrode can usually be designed more simply.

It can be particularly advantageous, if in at least one regeneration mode at least intermittently no ions, particularly at least intermittently no ions of the first ion type, are released. This improvement of the method can be realized, for example, by completely turning off the ionization device. It has also turned out that a regeneration of the overall arrangement can occur even after relatively short time periods. Typically, off times in a range between 5 and 30 seconds are sufficient (in the case of on times in the normal operating mode of typically 30 seconds to 3 minutes). This solution is particularly advantageous for this reason, because it can be realized especially simply in terms of design. In particular, this method can be used for ionization devices, which have only a single high-voltage source and/or a single high-voltage electrode. An especially rapid regeneration can be realized in this case particularly when relatively moist air is present, because it promotes a rapid discharge of electrostatic accumulations.

Preferably, the method is carried out in such a way that at least intermittently and/or at least in areas a local field compensation of electric fields occurs with the aid of image charges, especially during use of passively acting design measures. The inventors have discovered to their own surprise that especially well conducting, broadly applied materials and/or especially well insulating surfaces do not result in an especially high concentration of released ions. Rather, it turned out that an especially high ion discharge can occur when the components downstream of the ionization device have a relatively low electrical conductivity over rather great distances and/or have a relatively high electrical conductivity in a small-scale area. As a result, only a locally acting electric field compensation can be realized, whereas in a large-scale area no electric field compensation can occur (or only a low or slow electric field compensation). The size of the local structures, in which a significant field compensation can occur, in this case is typically within a range of a few centimeters (or square centimeters), for example, with typical lengths and/or widths of 0.5 cm, 1 cm, 1.5 cm, 2 cm, 3 cm, 4 cm, or 5 cm. It is advantageous if the local field compensation occurs due to passively acting design measures. Such passively acting design measures can usually be realized especially simply and cost-effectively. Exemplary embodiments of such passively active design measures are in particular the designs described in greater detail below in the form of a plurality of electrically conductive material sections, one or more continuous, electrically slightly conductive components, flat or film-like designs, and/or self-adhesive realizations, which are described in connection with the ionization device described in greater detail below.

The method can be carried out in such a way that the regeneration mode occurs in a time-controlled manner and typically lasts longer than 2 seconds, 5 seconds, 10 seconds, 20 seconds, 30 seconds, 45 seconds, and/or 1 minute and/or typically less than 20 seconds, 30 seconds, 45 seconds, 1 minute, 2 minutes, 3 minutes, 4 minutes, and/or 5 minutes. A time-controlled realization of the regeneration mode is typically especially simple. In particular, no additional components such as especially sensors or the like are generally needed. The indicated time durations have proven especially advantageous in initial tests.

Furthermore, an ionization device, particularly an ionization device for ionizing air for ventilating interior spaces, preferably the interior spaces of vehicles, is proposed, which has at least one first ionizing component for the at least intermittent release of ions of one ion type, and is refined to the effect that the ionization device is formed and set up in such a way that it is operated at least intermittently in at least one regeneration mode, particularly in at least one regeneration mode according to the previously described claims. This type of ionization device, compared with prior-art ionization devices, has an especially high time-averaged discharge of ions, and thereby simultaneously has a relatively simple structural design of the arrangement. The proposed ionization device is especially suitable particularly for carrying out the previously described method.

It is advantageous if in the case of the ionization device at least one control device for controlling the ionization device, particularly a control device for carrying out the regeneration mode, is provided. A single board computer or the like can be used, for example, as such a control device. It is possible in particular that the functionality of an electronic control (for example, an electronic control for a vehicle HVAC system) typically present in any case in motor vehicles is also taken on. Because the computing load for the control unit is typically relatively small, this additional work load is generally not a problem.

It is proposed further to provide the ionization device with at least one second ionizing component, particularly with an ionizing component for the at least intermittent release of ions of a second ion type, different from the first ion type. The already described corresponding regeneration mode can be carried out especially advantageously with this type of arrangement.

It is advantageous, furthermore, if the ionization device has at least one air guiding device, particularly at least one ventilation duct and/or at least one air outlet nozzle, which has a locally acting field compensation component at least in areas. It is possible with this type of design to release an especially high proportion of ions generated by the ionization device, for example, into a vehicle interior. A correspondingly designed ionization device therefore proves to be especially effective. The local field compensation component in this case can be formed in any manner desired on the outside, inside, and/or in an intermediate layer of the air guiding device (such as, for example, a ventilation duct and/or an air outlet nozzle).

It is possible that in the case of the ionization device at least one locally acting field compensation component is formed at least in areas as a plurality of electrically conductive material sections. The material sections can be, for example, metal plates, small metal blocks, or similar parts. This type of locally acting field compensation component has only a slight tendency to destroy ions, while having a simultaneously relatively simple and cost-effective structure. In other respects, it should also be possible to be able to attain protection for the proposed design also without the concept of a "locally acting field compensation component."

In addition or alternatively, it is also possible that at least one locally acting field compensation component is formed at least in areas as a continuous, electrically slightly conductive component. Here, for example, so-called ESD films or similar components can be used (ESD=Electro Static Discharge. Here as well, it has turned out that components of this type are especially suitable as local field compensation component and accordingly an especially high proportion of generated ions are "let through" by the corresponding components. Nevertheless, the design of the corresponding ionization device continues to be relatively simple and cost-effective. In this regard as well, it should be possible to be able to attain protection for the proposed design also without the concept of a "locally acting field compensation component."

Further, it has proven advantageous if in the case of the ionization device at least one locally acting field compensation component, especially at least one electrically conductive material section and/or at least one electrically slightly conductive component is formed flat, preferably film-like. Initial tests have shown that in the case of locally acting field compensation component it is usually not (or only to a slight extent) a matter of their depth (particularly their component dimensions in a direction perpendicular to the airflow direction). With a flat or film-like structure, therefore, a highly effective device can be formed with a low material consumption (and therefore low weight and/or at low cost). Typical thicknesses of flat components and/or films are within the range of 0.1 mm.

Further, it may prove advantageous if in the case of the ionization device at least one locally acting field compensation component, particularly at least one electrically conductive material section and/or at least one electrically slightly conductive component are made to be self-adhesive. In the case of this type of structural design, an especially simple mounting of the locally acting field compensation component on the other component groups can be realized. Moreover, it should be pointed out that, for example, metal films and/or ESD films can often be obtained commercially in self-adhesive form in any case. Further cost reduction can be achieved as a result.

Moreover, an HVAC system, particularly a vehicle HVAC system is proposed which has at least one ionization device with the previously described design. The HVAC system then has in a similar way the properties and advantages already described in relation to the previously described ionization device. The motor vehicle, for which the vehicle HVAC system is intended, can be arbitrarily a water craft, an aircraft, and/or a land vehicle (rail-mounted/not rail-mounted).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
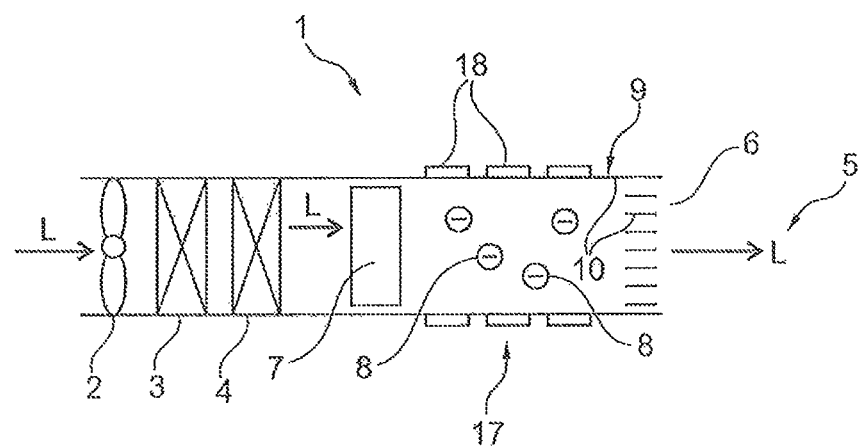
FIG. 1 shows a vehicle HVAC system with an ionization device in schematic cross section.

A vehicle HVAC system is shown in a schematic cross-sectional view in FIG. 1. Vehicle HVAC system 1 in this case is shown in a highly simplified view, which focuses substantially on the areas related to the air conditioning by ionization of the airflow L to be conditioned by the HVAC system 1.

The air L drawn in by vehicle HVAC system 1 with the aid of a fan 2 is first passed through a filter 3, in which pollen, particles of dirt, and the like, which may be present in the ambient air, are filtered out. Next, airflow L is passed through a heater 4 and accordingly warmed up (of course, the warming up can also occur by means of a mixture of warm and cold air; moreover, the air can also be cooled with the use of an evaporator, etc.). The already largely conditioned airflow L, before it is released into a vehicle interior 5 via an air vent nozzle 6, is first passed through an ionization module 7. For example, anions 8, which are perceived by vehicle passengers as "fresh air," are generated in said ionization module 7. The anions generated by ionization module 7 in this regard must first be taken through correspondingly designed air ducts 9 and flow through air vent nozzle 6. In this regard, some of the anions 8 generated by ionization module 7 hit the walls of air duct 9 or air vent nozzle 6 and give up their charge to the respective wall area 10. Over time, as a result, electrostatic charging of certain wall areas 10 of air guide element 9 and air vent nozzle 6 occurs. The electrostatic charging of the respective wall areas 10 is not uniform, however, so that electric fields arise between wall areas 10 charged with a different intensity. The electric fields in turn influence the airflow L (especially the ions present in the airflow L), particularly the movement path of anions 8, so that the system behaves extremely dynamically and is difficult to predict.

Figure 2:
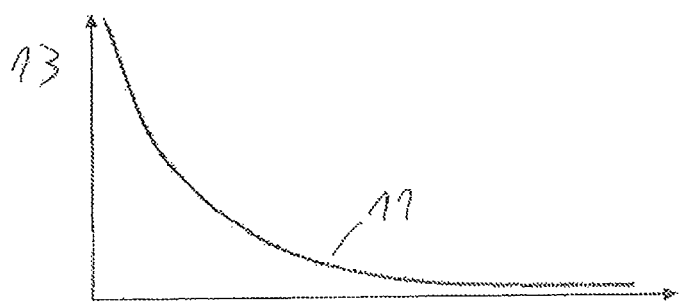
FIG. 2 shows the time course of the ion concentration output by a vehicle HVAC system into the vehicle interior in a continuous operating method.

The electrostatic charging of wall areas 10 of air duct 9 and air vent nozzles 6, however, usually causes a great reduction of anions 8 finally exiting into vehicle interior 5. Accordingly, ionization module 7 would have to generate a correspondingly great number of anions 8. To this end, ionization module 7 would have to be designed accordingly larger (as a result of which it would become more expensive and heavier), and accordingly more electrical energy would have to be provided for ionization module 7. The decline in the concentration of anions 8 released into vehicle interior 5 is shown schematically as a function graph 11 in FIG. 2. In FIG. 2, the time t is plotted along the abscissa 12, whereas the ion concentration, released into vehicle interior 5, is plotted along the ordinate 13. The great decline in the ion concentration is clearly evident. Typically, after a time period of 1 to 5 minutes only every tenth generated anion 8 reaches vehicle interior 5. The effect is therefore extremely significant.

Figure 3:
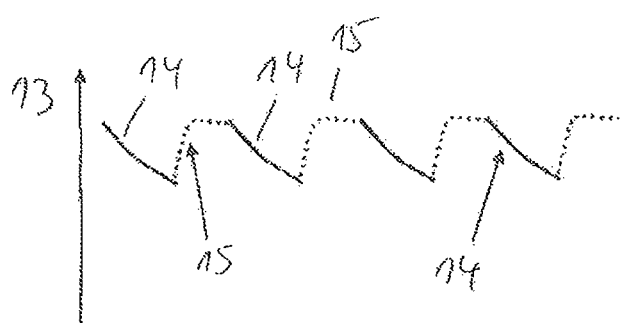
FIG. 3 shows the time course of the ion concentration output by a vehicle HVAC system into the vehicle interior with use of a first type of regeneration method.

To increase the concentration of anions 8 released into vehicle interior 5 as a time average, it is proposed to operate ionization module 7 only over a certain time period (typically 1 to 3 minutes) in a normal operating mode 14 (compare with FIG. 3). After a certain time interval has elapsed, vehicle HVAC system 1 is switched to a regeneration mode 15, in which not only anions 8 (as shown in FIG. 1) are generated, but in which cations are also generated in addition by ionization module 7 (which must be designed accordingly for this). The cations generated by ionization module 7 are generated only "temporarily" in the present illustrated exemplary embodiment and are used only for generating a second ion type, whereby in the present case it is also a matter of anions 8 (albeit also of a different ion type). The "alternating" generation of different ion types results in a discharge of the statically charged wall areas 10, so that due to the regeneration phase 15 the concentration of anions 8 released into vehicle interior 5 not only declines further but in contrast can increase again. After the regeneration phase 15 has been completed (which typically lasts 5 to 30 seconds), a normal operating mode 14 turns on again, which in turn is followed by a regeneration mode 15, and so forth. This process is shown in FIG. 3. Here as well, the time is shown along the abscissa 12, whereas the concentration of the anions released into vehicle interior 5 is shown along the ordinate 13.

Figure 4:
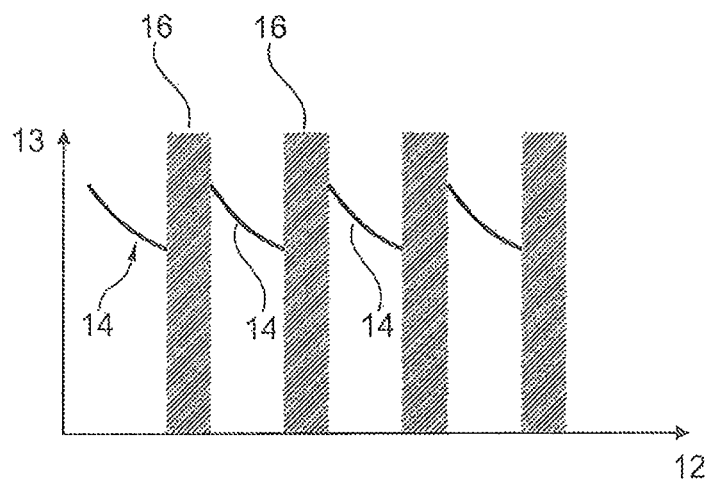
FIG. 4 shows the time course of the ion concentration output by a vehicle HVAC system into the vehicle interior with use of a second type of regeneration method.

A second possible method for controlling an ionization module 7 is that ionization module 7, in analogy to the previous exemplary embodiment, is first operated in a normal operating mode 14 (compare with FIG. 4). After a certain time period has elapsed (typically 1 to 3 minutes), ionization module 7 is regenerated 16 in that ionization module 7 is simply turned off, and thus no ions are generated (particularly no anions 8). In this regeneration phase 16, the static charges along wall areas 10 of air duct 9 and air vent nozzle 6 can also decline, for example, because of the moisture typically present in the airstream L. The duration of the regeneration phase is typically 5 to 30 seconds. After regeneration phase 16 has been completed, a cycle again occurs in which ionization module 7 is again operated in a normal operating mode 14, then again regenerated 16 by turning off, and so forth. The described process is illustrated in greater detail in FIG. 4. Here as well, the time is plotted along the abscissa 12, whereas the concentration of anions 8 released into the vehicle interior 5 is shown along the ordinate 13.

Although an ion concentration, clearly increased compared with known operating methods in a time average (compare with FIG. 2), can be released into vehicle interior 5 with the proposed operating method, particularly with the operating method according to FIG. 3 or FIG. 4, it is advisable, in addition to the proposed operating modes (or optionally in addition to other conceivable advantageous operating modes), to provide additional design measures, which because of their design properties again increase the proportion of anions 8 (or other ions) released into vehicle interior 5.

Figure 5:
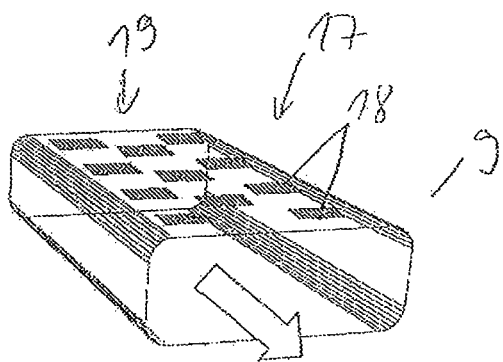
FIG. 5 shows a first exemplary embodiment of an air duct with the locally acting field compensation component in a schematic, perspective view.

A possibility for this type of structural feature is, for example, the arrangement of a grid 17 of metal films 18 arranged at a distance to one another, as already indicated in FIG. 1. Possible details on the position and arrangement of metal films 18 in air duct 9 can be observed in addition in FIG. 5. Metal films 18 are formed as self-adhesive metal films and are glued, for example, to the already finished air duct 9 (which was fabricated, for example, from plastic with the use of an injection molding process). As is evident from FIGS. 1 and 5, metal films 18 are located in this case on the outside 19 of air duct 9. In the currently described exemplary embodiment, metal films 18 are arranged electrically insulated from one another and moreover not grounded. In another conceivable exemplary embodiment, it is also possible that (a part of) metal films 18 (is) are connected electrically to one another (optionally via high-resistance electrical conductors) and/or (is) are connected to ground (optionally via a resistance electrical conductor). Regardless of the specific detail design, it turned out that the locally limited mobility of the charge carriers in the individual metal films 18 has the effect that over a limited stretch image charges, which could correspond to electrical charges or charge clusters on inner wall areas 10 and/or in the interior of air duct 9, can arise in metal films 18. The image charges formed thereby cause a reduction or advantageous redistribution of the present electric fields, which ultimately can lead to a higher proportion of anions 8 passing through air duct 9 (without these being lost at wall areas 10 of air duct 9 or air vent element 6). As a result, the exit of anions 8 into vehicle interior 5 can be improved.

Figure 6:
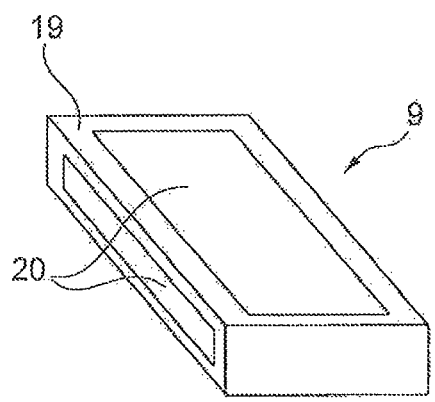
FIG. 6 shows a second exemplary embodiment of a ventilation duct with the locally acting field compensation component in a schematic, perspective view.

Another possible exemplary embodiment for a device, which causes this type of locally acting field compensation, is shown in FIG. 6. Here, likewise, an air duct 9 is shown in a schematic perspective view. In this case, so-called ESD films 20 are attached, applied over a large area, to the outer sides 19 of air duct 9. ESD films 20 in the present exemplary embodiment are formed as self-adhesive films, which are glued to the finished air duct 9. Because of the poor electrical conductivity, relative to metal films, but good electrical conductivity relative to electrical insulators, a local compensation of arising electric fields results effectively here as well, whereby this compensation occurs only in a relatively narrowly limited surface area. The behavior here seems to be that the electrical resistance of ESD films 20 for the formation of image charges does not emerge as a negative factor over relatively short spatial distances (for example, a few centimeters). Over longer spatial distances (for example, 10 centimeters or more), the electrical resistance of ESD films 20, in contrast, appears to represent effectively an impediment to the movement of electrical image charges, and thereby to represent an impediment to the compensation of electric fields. Another possible explanation for the properties of ESD film 20 is that ESD film 20 has only a limited longitudinal conductivity. This only limited longitudinal conductivity permits a locally greatly varying image charge (also over short distances), or the merely low longitudinal conductivity makes it possible that locally highly different surface charges can be discharged. It is also possible in the exemplary embodiment of FIG. 6, shown in the present case, that the individual ESD films 20 (optionally high-resistance) are connected electrically to one another and/or are connected to ground (optionally via high-resistance connecting lines).

Further information can be obtained from the patent application with the title "Air conduction channel for an ionization device", which was filed on the same day and by the same applicant under the applicant's application number 09-B-110-2 at the German Patent and Trademark Office. The disclosed content of said patent application is incorporated in its entirety in the disclosed content of the present application.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling an ionization device for ionizing air for ventilating interior spaces or interior spaces of vehicles, the method comprising:

providing the ionization device inside a cooling and heating system duct of a vehicle;

releasing, via the ionization device, at least intermittently ions of a first ion type into the cooling and heating system duct; and operating the ionization device at least intermittently in at least one regeneration mode, wherein, in at least one regeneration mode, ions with a second ion type different from the first ion type are released at least intermittently, and wherein, the ions with the second ion type are released solely in the at least one regeneration mode.

2. The method according to claim 1, wherein the ions of the second ion type are released at least intermittently in addition and/or at least intermittently alternatively to the ions of the first ion type.

3. The method according to claim 1, wherein, in at least one regeneration mode, at least intermittently no ions or at least intermittently no ions of the first ion type are released.

4. The method according to claim 1, wherein at least intermittently and/or at least in areas a local field compensation of electric fields by image charges occurs during use of passively acting design measures.

5. The method according to claim 1, wherein the regeneration mode occurs in a time-controlled manner and lasts longer than 2 seconds, 5 seconds, 10 seconds, 20 seconds, 30 seconds, 45 seconds, and/or 1 minute and/or less than 20 seconds, 30 seconds, 45 seconds, 1 minute, 2 minutes, 3 minutes, 4 minutes, and/or 5 minutes.

6. The method according to claim 1, further comprising providing metal films to an outside of the heating and cooling duct at a position downstream from the ionization device, in a direction of air flow.

7. The method according to claim 1, further comprising providing electrostatic dissipative films to an outside of the heating and cooling duct at a position downstream from the ionization device, in a direction of air flow.

8. The method according to claim 1, wherein, in at least one automatically started regeneration mode, no ions are released.

9. The method according to claim 1, wherein the ions of the first ion type are anions.

10. An ionization device for ionizing air for ventilating interior spaces or interior spaces of vehicles, the device comprising:

at least one first ionizing component for intermittent release of ions of a first ion type, the ionization device being configured such that it is operated at least intermittently in at least one regeneration mode, at least one air guiding device, a ventilation duct and/or an air outlet nozzle, that have a locally acting field compensation component at least in areas, and at least a second ionizing component for intermittent release of ions of a second ion type that are different from the first ion type, wherein the ions of the second ion type are released solely in the at least one regeneration mode.

11. The ionization device according to claim 10, wherein the locally acting field compensation component is placed to an outside of the at least one air guiding device, ventilation duct or air outlet nozzle.

12. The ionization device according to claim 10, further comprising a control device for controlling the ionization device for carrying out the regeneration mode.

13. The ionization device according to claim 10, further comprising at least a second ionizing component for intermittent release of ions of a second ion type that are different from the first ion type.

14. The ionization device according to claim 10, wherein at least one locally acting field compensation component is formed at least in areas as a plurality of electrically conductive material sections.

15. The ionization device according to claim 10, wherein at least one locally acting field compensation component is formed at least in areas as a continuous, electrically slightly conductive component.

16. The ionization device according to claim 10, wherein at least one locally acting field compensation component, at least one electrically conductive material section and/or at least one electrically slightly conductive component is formed flat or film-like.

17. The ionization device according to claim 16, wherein the at least one locally acting field compensation component, at least one electrically conductive material section and/or at least one electrically slightly conductive component are made to be self-adhesive.

18. An HVAC system, particularly a vehicle HVAC system, comprising at least one ionization device according to claim 10.

* * * * *